Dec. 22, 1959      F. RETORNAZ      2,918,142
DEVICE FOR AUTOMATIC LUBRICATION OF CYLINDERS
Filed March 29, 1957
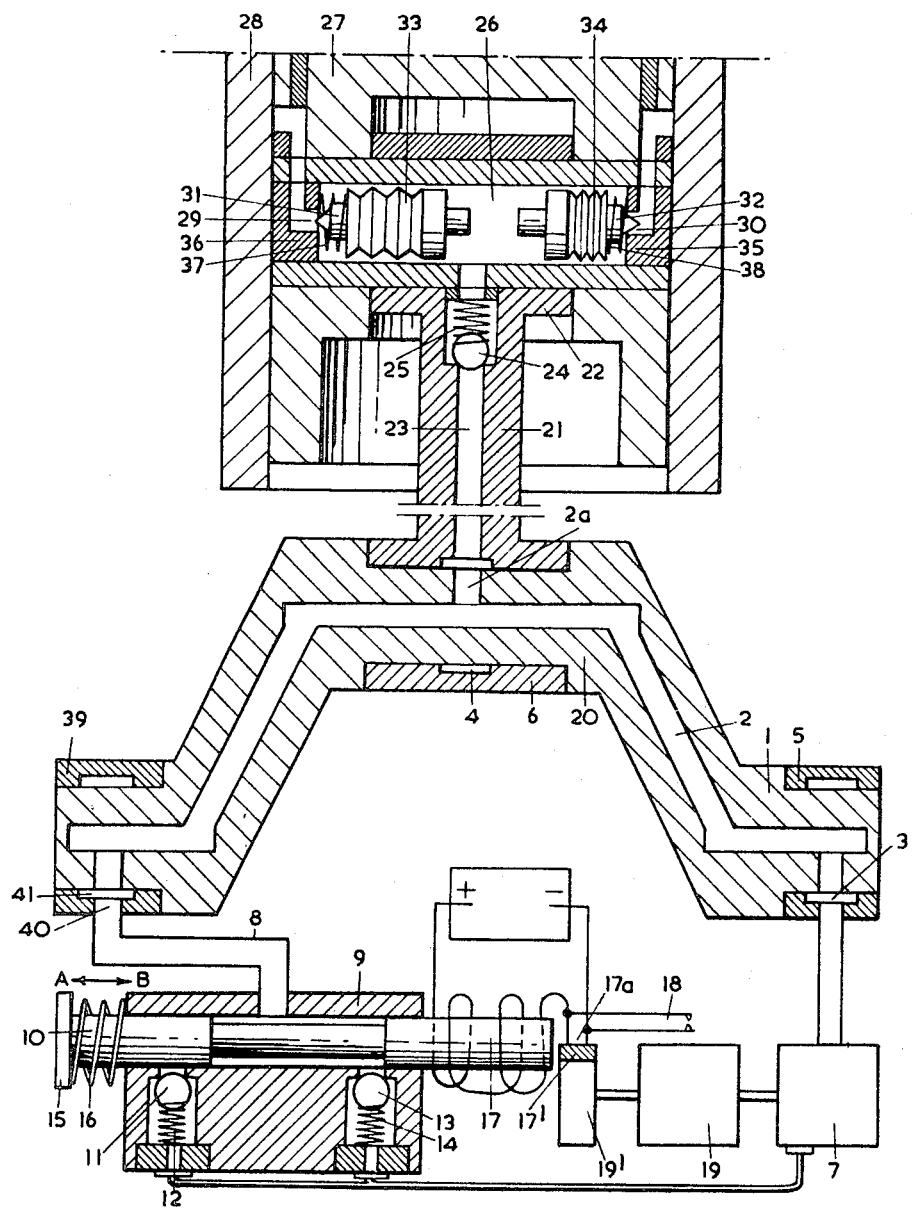
Inventor
Francois RETORNAZ
By
Chatwin & Company
Attorneys

United States Patent Office 2,918,142
Patented Dec. 22, 1959

2,918,142

DEVICE FOR AUTOMATIC LUBRICATION OF CYLINDERS

François Retornaz, Marseille, France

Application March 29, 1957, Serial No. 649,566

Claims priority, application France March 30, 1956

7 Claims. (Cl. 184—6)

This invention relates to the lubrication of moving parts of machinery, particularly for example the pistons and cylinders of internal combustion engines.

The object of the invention is to provide means whereby moving parts may be lubricated by a source of lubricant replenished at intervals from a general circulation of lubricant and in which the lubricant applied to said moving parts is fully lost and not returned to the general circulation.

In order that the nature of the invention may be readily ascertained, an embodiment thereof in the form of a lubrication system for the big end bearing, little end bearing, and cylinder wall of an internal combustion engine is hereinafter particularly described with reference to the accompanying drawing which is a central vertical longitudinal section through part of a crankshaft, connecting rod, piston and cylinder, together with lubricant feed and control apparatus.

In this drawing, the crankshaft 1 has the usual axial oil flow bore 2 fed through a peripheral groove 3 at a main bearing 5. A channel connects the stationary main bearing liner with an oil pump 7. On the crank pin portion 20 of the crank shaft is engaged the big end bearing 6 of a connecting rod 21, said bearing 6 having the usual peripheral recess to receive oil passing out through the bore 2a. Another main bearing 39 has a bore 40 allowing outflow of the oil to a peripheral recess 41 for return of the oil to the usual sump. This return is effected through a pipe 8 leading to a valve casing 9 in which are arranged a first low pressure outlet valve including a ball 11 relatively lightly loaded into closing position by a spring 12, and a second high pressure outlet valve including a ball 13 relatively heavily loaded into closing position by a spring 14. In a channel of the casing 9 is arranged a slidable valve member 10 which, in its extreme position to the right in this drawing as illustrated, allows oil flow only to the high pressure valve. In its other extreme position to the left in this drawing, the valve member 10 would allow oil flow only to the low pressure outlet valve. The valve member 10 is urged into a feed position, in the direction shown by arrow "A," at the left in this drawing, by a compression spring 16 acting between a head 15 on the valve member 10, and the casing 9. Thus, the oil return system to the pump 7 would normally operate at low pressure. The right hand end portion 17 of the valve element 10 is made of ferrous metal and acts as the core of an electromagnet which can be energised by connection to the usual storage battery. Connections are made thereto through a switch 17a the contacts of which are closable by a plate 17' on the rotor 19' of an interruptor device 19 driven from the oil pump 7. At intervals, the plate 17' closes the contacts of the switch 17a, causing the electromagnet to be energised so that the valve element 10 moves to the right in the direction of the arrow "B," whereby the oil outflow can then only pass through the high pressure outlet valve, in the position as illustrated.

Reference is now made to the connecting rod 21 which at its end remote from the big end bearing is engaged about the little end gudgeon pin engaged in the piston 27 slidable in the cylinder 28. The gudgeon pin is hollow and includes at each end a block 35, 36 forming a valve seating and connected by a passage 29, 30 to an outlet in the wall of the piston. In the gudgeon pin are arranged two valve members 31, 32, each being adapted to seat against the respective seatings 36, 35, but being normally held off by a light compression spring 37, 38. These valve members are mounted on airtight and air-filled compressible bellows 33, 34 which are freely slidable in the bore of the gudgeon pin. The passage 23 of the connecting rod, receiving oil from the peripheral recess 4, opens into a valve chamber containing a ball valve 24 relatively heavily loaded by a spring 25 into closed position. Its loading is heavier than that of the ball 11 but lighter than that of the ball 13. This valve chamber leads into the interior of the gudgeon pin.

The operation is as follows: When the contacts of the switch 17a are open, the valve member 10 is in its rest position to the left and the oil outflow is at low pressure. Thus, the pump supplies a relatively low pressure oil feed to the main bearings and to the big end bearing, but no oil passes through the valve 24.

When the contacts of the switch 17a are subsequently closed, the energisation of the electromagnet causes the valve member 10 to assume the position illustrated, in which the oil can only escape through the high pressure outlet valve 13, 14. The pressure in the system is such that the valve 24, 25 in the connecting rod is opened and oil flows into the interior 26 of the gudgeon pin. The movement of the incoming oil causes the valve assemblies 31, 33 and 32, 34 to be moved outwardly against their light return springs until their conical outer ends close off the apertures in the valve seatings 35 and 36. This seals the chamber 26 so that as the oil continues to flow in through valve 24, 25, the compressible bellows 33, 34 are compressed to the shortened state illustrated for the right hand element in this drawing. When the contacts of the switch 17a are subsequently opened again, the valve member 10 moves to the left and the oil system returns to its low pressure state, whereupon the valve 24 is closed by its spring 25. As there is no longer any flow into the chamber 26, the light springs 27, 38 move the valve members 31, 32 off their seatings, allowing outflow of oil, as the bellows 33, 34 tend to expand through the channels leading to the cylinder wall.

The lubrication system thus normally operates as a low pressure system supplying only the main and big end bearings. Periodically however, the system temporarily becomes a high pressure system during which period the gudgeon pin is filled with oil at high pressure and the bellows are compressed. The system returns to low pressure and the valve 24 isolates the low pressure system from the gudgeon pin supply. The oil in the gudgeon pin then escapes at a rate determined by the clearance of the piston in the cylinder and the amount of compression of the bellows, so that a relatively slow but steady supply of oil to the piston and cylinder surfaces is obtained. This oil is lost, and not returned to the system. Obviously, the period of energisation of the electromagnet can be made to occur at suitable intervals just before the oil in the gudgeon pin ceases to flow out, so that the supply of oil to the piston and cylinder surfaces will be substantially continuous, except for the short periods of re-charging the chamber 26.

Handles 18 are provided on the switch 17a to enable the change-over to high pressure to be made after a time shorter than the usual period of the interruptor.

I claim:
1. Means for supplying lubricant to a bearing surface between two relatively movable elements, comprising a lubricant pump, a lubricant flow circuit connecting the outlet and inlet sides of said pump, a flow restrictor arranged in the flow circuit and having its loading adjustable selectively to a low and high pressure position, a chamber, said chamber having outlet passage means communicating with the bearing surface and inlet passage means communicating with the flow circuit, a non-return inlet valve in the inlet passage means, and a resiliently compressible member in the chamber, the non-return inlet valve and the resiliently compressible member being designed such that in the high pressure position of the flow restrictor but not in its low pressure position the pressure in the flow circuit is sufficient to open the non-return valve, and to compress the compressible member, whereby the resiliently compressible member closes the outlet passage means.

2. Means for supplying lubricant to the bearing surface between a piston and cylinder of an internal combustion engine, comprising a lubricant pump, a lubricant flow circuit connecting the outlet and inlet sides of said pump, a flow restrictor arranged in the flow circuit and having its loading adjustable selectively to a low and high pressure position, a chamber in the piston, said chamber having outlet passage means communicating with the bearing surface of the piston and inlet passage means communicating with the flow circuit, a non-return inlet valve in the inlet passage means, and a resiliently compressible member in the chamber, the non-return inlet valve and the resiliently compressible member being designed such that in the high pressure position of the flow restrictor but not in its low pressure position, the pressure in the flow circuit is sufficient to open the non-return valve and to compress the compressible member, whereby the resiliently compressible member closes the outlet passage means.

3. Means for supplying lubricant to the bearing surface between a piston and cylinder of an internal combustion engine, comprising a lubricant pump driven by the engine, a crankshaft having internal channels for leading oil to the usual main and crankpin bearing surfaces thereon, a pipe connection between the outlet of the lubricant pump and one crankshaft channel, a flow restrictor arranged in another pipe connection between another crankshaft channel and the inlet of the lubricant pump, said flow restrictor having its loading adjustable selectively to a low or a high pressure position, a hollow gudgeon pin in the piston having an outlet passage communicating with the bearing surface of the piston, a connecting rod engaged by bearings with the gudgeon pin and with the crankpin, said connecting rod having an internal passage communicating at one end with the interior of the gudgeon pin and at the other end with the crankshaft lubricant channel, a non-return inlet valve in the connecting rod passage, and a compressible bellows means in the gudgeon pin, the non-return valve and the compressible bellows means being so designed that in the high pressure position of the flow restrictor but not in its low pressure position, the pressure in the crankshaft lubricant channel is sufficient to open the non-return valve and to compress the bellows, whereby the bellows means closes the outlet passage.

4. Means for supplying lubricant to the bearing surface between a piston and cylinder of an internal combustion engine, as claimed in claim 3, including a valve seating connected to the outlet passage of the hollow gudgeon pin, said compressible bellows means including a valve member movably disposed in the gudgeon pin and adapted to seat on the valve seating to close said outlet passage, and spring means to urge the valve off the seating.

5. Means for supplying lubricant to the bearing surface between a piston and cylinder of an internal combustion engine, as claimed in claim 3, wherein the flow restrictor comprises a casing having a single inlet port and two outlet ports, said two outlet ports being connected to said other pipe connection leading to the inlet of the lubricant pump, a high pressure valve and a low pressure valve arranged one in each of the outlet ports, and a slidable valve member in the casing adapted in one end position to provide communication between the inlet and the low pressure outlet only, and in the other end position to provide communication between the inlet and high pressure outlet only.

6. Means for supplying lubricant to the bearing surface between a piston and cylinder of an internal combustion engine, as claimed in claim 3, including an electromagnet device coupled to the flow restrictor and arranged when energised to place the flow restrictor in high pressure position against the action of spring loading.

7. Means for supplying lubricant to the bearing surface between a piston and cylinder of an internal combustion engine, as claimed in claim 6, including a switch, connections between the switch and the electromagnet device and a storage battery, and means driven by the engine for periodically closing the switch.

References Cited in the file of this patent
UNITED STATES PATENTS

| 1,694,518 | Rushmore | Dec. 11, 1928 |
| 2,438,816 | Moore | Mar. 30, 1948 |